United States Patent [19]

Nause

[11] Patent Number: 4,615,223

[45] Date of Patent: Oct. 7, 1986

[54] INCREASING FRICTIONAL RESISTANCE MEASURING APPARATUS

[76] Inventor: Gregory L. Nause, 18 W. Main St., Newtonsville, Ohio 45148

[21] Appl. No.: 713,725

[22] PCT Filed: Mar. 6, 1984

[86] PCT No.: PCT/US84/00376

§ 371 Date: Feb. 11, 1985

§ 102(e) Date: Feb. 11, 1985

[87] PCT Pub. No.: WO85/04011

PCT Pub. Date: Sep. 12, 1985

[51] Int. Cl.$^4$ .............................................. G01L 5/13
[52] U.S. Cl. .................................. 73/862.03; 446/434
[58] Field of Search ...................... 73/862.03; 446/434

[56] References Cited

U.S. PATENT DOCUMENTS

| | | | |
|---|---|---|---|
| 1,603,521 | 10/1926 | Davidson et al. | 73/862.03 |
| 3,633,413 | 1/1972 | Case | 73/862.03 |
| 3,667,291 | 6/1972 | Peak | 73/862.03 |
| 3,741,010 | 6/1973 | Luedtke | 73/862.03 |
| 4,389,810 | 6/1983 | Green | 73/862.03 X |

*Primary Examiner*—Charles A. Ruehl
*Attorney, Agent, or Firm*—Wood, Herron & Evans

[57] ABSTRACT

A frictional resistance measuring apparatus having a platform (28) attached to a frame (20). A pair of tandem wheels (36) are also attached to the frame (20), the combination providing a resistance surface and a rotational drive source when placed upon the ground or floor. A movable weight box (38) is slideably disposed and captivated within the frame (20) and is free to move fore and aft. A gear reduction drive arrangement in the form of gears and roller chains transmit the rotation of the wheels (36) to a linear movement when removably connected to the weight box (38). When a remote power source in the form of a model vehicle is attached to the front of the apparatus and operated, the frictional resistance of the platform (28) is increased proportionately as the weight box (38) simultaneously moves forward from the rear placing the box with weights progressively closer to the platform (28) thereby increasing the resistance providing measurement of the pulling power of the vehicle.

4 Claims, 12 Drawing Figures

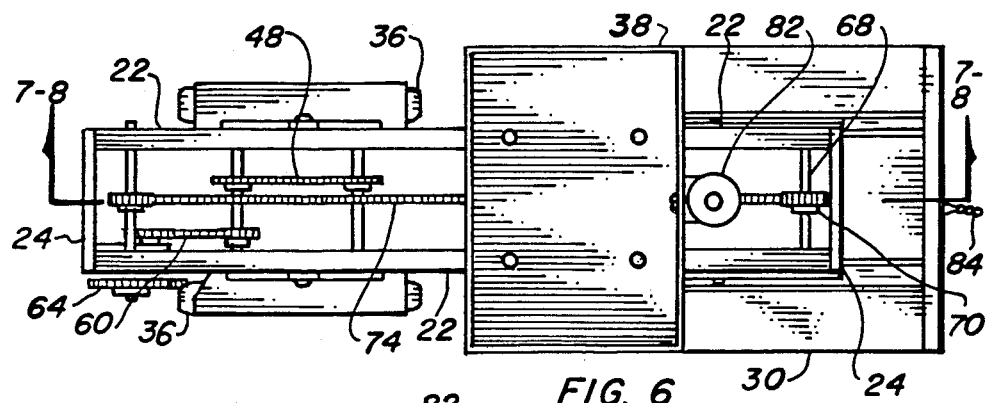
FIG. 6
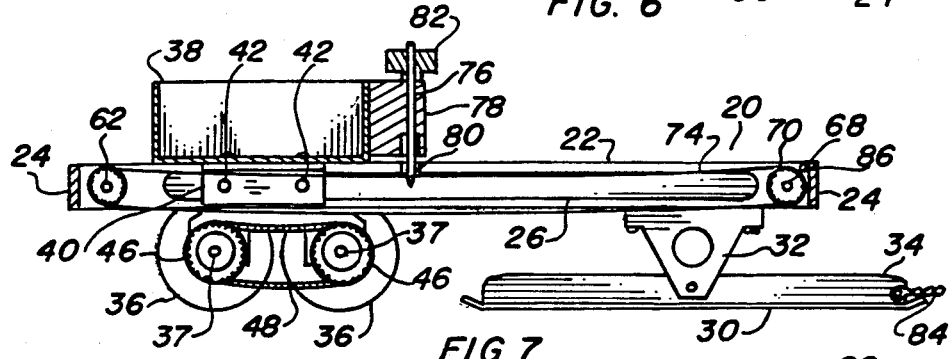
FIG. 7
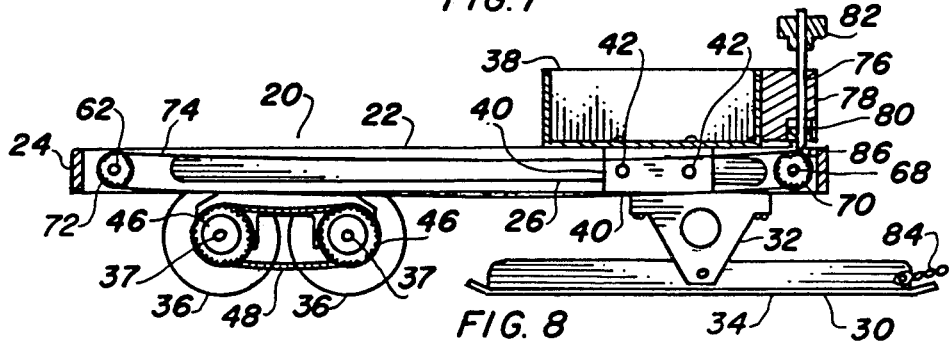
FIG. 8
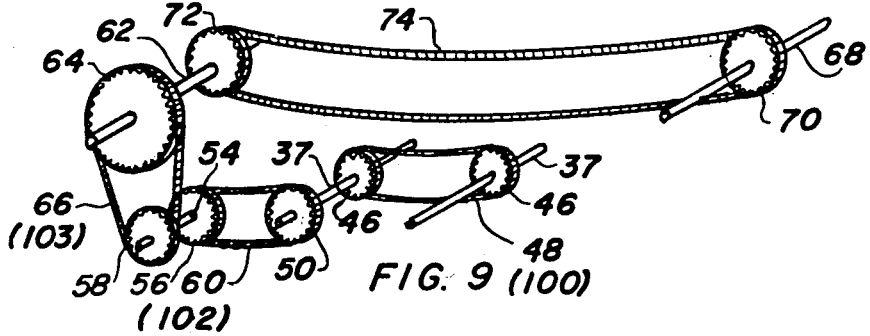
FIG. 9 (100)

INCREASING FRICTIONAL RESISTANCE MEASURING APPARATUS

TECHNICAL FIELD

The invention pertains to the general field of measuring and testing apparatus and more specifically to sliding, weighted resistance devices, having variable positioned dead weight for measuring the pulling force on a flat surface in relationship to distance.

BACKGROUND ART

Motor powered vehicles for hauling loads or pulling farm implements have been in use for a long period of time, but have recently kindled an interest in individual competition indicative of the power of a particular vehicle. So called tractor pulling contests have become popular and have led to the development of apparatus that acts to produce an increasingly greater resistance to the pull of the tractor until it is substantially slowed down, or actually stopped.

Prior art has commonly used large flat ground engaging sleds with increasingly added weight. More recently self-contained apparatus has been developed to accomplish this task. Along with interest in this type of competition, model builders have also been active in developing miniature vehicles powered by electricity or liquid fuel that simulate an actual tractor, truck or automobile. They too have created a need for measuring apparatus on a small scale that duplicates the function of the test sled. While the performance parameters are of the same nature, other problems arise not solved by prior art using a miniature replica.

The following U.S. patents are considered related to the invention:

| U.S. PAT. NO. | INVENTOR | ISSUED |
| --- | --- | --- |
| 3,659,455 | Watkins | 2 May 1972 |
| 3,491,590 | Watkins | 27 January 1970 |
| 1,603,521 | Davidson | 19 October 1926 |

Watkins in his first patent discloses a full-size weight transfer apparatus utilizing a sled upon which a tractor is statically positioned for dead weight and a cable is staked into the ground with a pulley arrangement providing movement of dead weight progressively over center. Further, an automatic trolley release mechanism is used that is responsive to movement of the apparatus at the end of the pull.

In Watkins second patent, an additional improvement is disclosed wherein a truck chassis is utilized for the dead weight and a sled is attached underneath with a fifth wheel, the front wheels of the chassis resting thereupon. The skid is removable allowing the truck, as the self-propelling means, to tow the skid to the starting point. Also, this disclosure employs a power take off from the prime mover to linearly move a dead weight on the chassis.

Davidson discloses a dynometer having a pair of skids 13 with a weighted container 17 on a pair of sloping guide rails with wheels 11 on the rear portion. In operation the tractive power is attached to a cable 19 that slides the container up the angular rails, decreasing the weight on the skids as more power is exerted. This structure and function is in direct opposition to the instant invention.

For background purposes and as indicative of the art to which the invention relates reference may be made to the following additional U.S. patents:

| | | |
| --- | --- | --- |
| 2,768,823 | Lindars | 30 October 1956 |
| 2,622,868 | Yeasting | 23 December 1952 |
| 2,518,568 | Pease | 15 August 1950 |
| 2,392,023 | Cooper | 1 January 1946 |

DISCLOSURE OF THE INVENTION

Model vehicles while duplicating their full size counterparts require prime movers in configuration of a completely different nature. These motors include direct current such as 1.5 to 12 volts and also liquid fuel powered engines. These piston engines, usually air-cooled two cycle, operate at relatively high speeds with gear trains to reduce the crankshaft rotation to a useable level. The need for a simple apparatus to measure the power of these models on a competitive basis has been long felt. It is, therefore, the primary object of the invention to provide a simple, self-contained apparatus that possesses the functional capabilities of comparing one model with the other without the necessity of attachment to the ground surface, or a separate motivating force in the form of a secondary prime mover.

An important object utilizes a simple method of increasing the frictional resistance to the ground surface by shifting the center of gravity of a weighted box from over a pair of tandum wheels to directly above a platform resistance surface. This is accomplished by using the rotation of the wheels when pulled by the model transmitting the rotational force to a linear force with a gear train integral with the apparatus itself. This requires only joining the model to the invention for operation of the entire sequence.

Another object provides an automatic disengagement of the weight box when maximum travel forward has been achieved. This is accomplished by utilizing a connecting pin that penetrates the linear drive chain and at the end of the sequence is forced upward out of the chain by the driven sprocket. This allows the weight box to be easily reset and travel forward with no further manual manipulation through the entire sequence of operation during a pulling contest.

Still another object lies in the variable speed ratio of the gear reduction system. Four separate drive lines are utilized by the invention, two of which may be changed quickly and easily changing the speed of the weight box. The primary objective of increased weight box speed is to eliminate the need for addition of weight in the box itself. Greater vehicle size and power demands an increase in weight box speed to achieve the desired center of gravity sooner, as to provide for consistant performance with a variety of pulling model vehicles. This quick change is accomplished in the preferred embodiment with different size sprockets installed on the shaft with a square hole and a quick disconnect retaining pin allowing interchangeability of the desired sizes commensurate with the ratio required. In another embodiment round belts are utilized and the speed ratio change is achieved with a pair of multi-grooved sheaves, commonly known as cone pulleys, in which the belt is rolled from one set of grooves to the other without dissembling any components.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 6 is a plan view of the preferred embodiment depicting the movable weight box in the intermediate position.

FIG. 7 is a cross-sectional view of the preferred embodiment taken along lines 7—7 of FIG. 6 with the weighted box in the starting position over the wheels.

FIG. 8 is the same as the above, except the weighted box has moved the entire length and is in the finished position with the connecting pin mechanism partially disconnected.

FIG. 9 is a partial isometric schematic of the gear reduction drive system with the gears completely removed from the apparatus and shown in their approximate relationship to pictorially illustrate the functioning of the system.

BEST MODE FOR CARRYING OUT THE INVENTION

Figure 1:
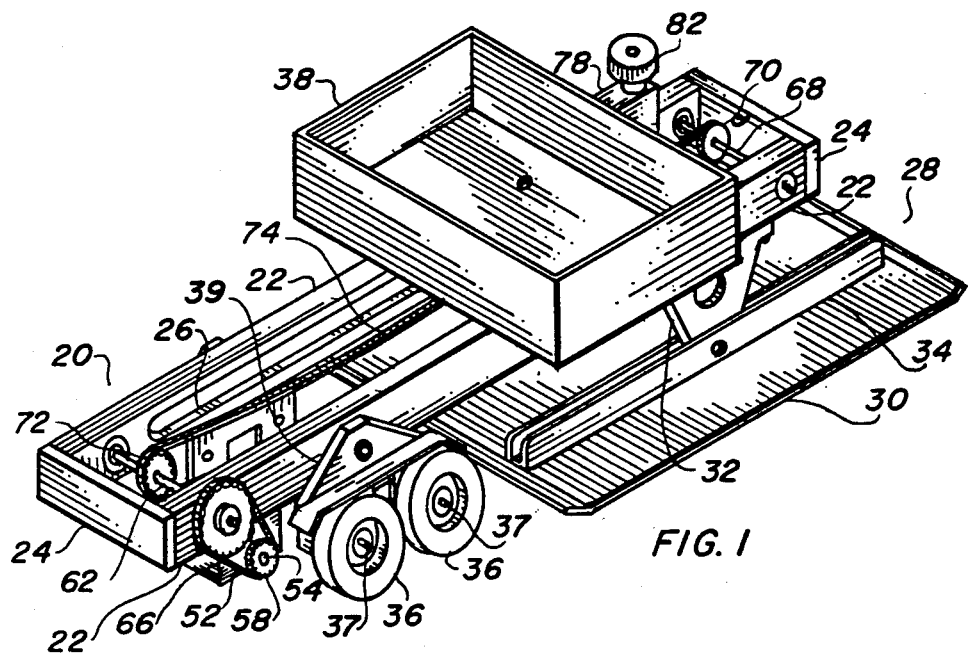
FIG. 1 is a partial isometric view of the preferred embodiment with the weighted box in the intermediate position.
Figure 2:
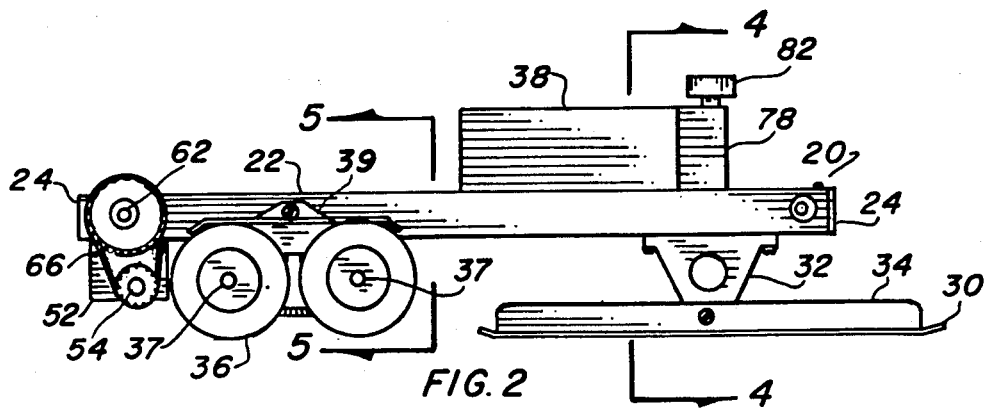
FIG. 2 is a side elevational view of the preferred embodiment on the road side.
Figure 3:
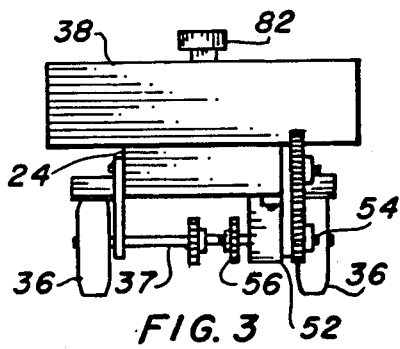
FIG. 3 is an end view of the preferred embodiment.

The best mode for carrying out the invention and the preferred embodiment as depicted in FIGS. 1 through 9 is comprised of a frame 20 having a pair of structural longitudinal members 22 and end plates 24 joined at the front and rear. The frame 20 is, therefore, in a rectangular box shape with sufficient structural integrity to withstand a dead weight load unsupported in the middle of the span. The longitudinal members 22 are recessed with a cavity 26 on the inside surface running almost the entire length. This cavity 26 makes the member 22 resemble a channel throughout most of its length and the legs facing each other are in parallel relationship. The frame 20 may be of any material suitable for the purpose, such as thermoplastic, wood, steel, with aluminum being preferred.

A platform 28 is hingeably attached to the frame 20 at the underside of the front portion. The platform 28 provides the extended surface upon which relative pulling resistance may be measured, as it provides an extended footprint upon the ground or floor. The platform 28 includes a sled pan 30 and a pair of support members 32 that are permanently attached to the underside of the frame members 22. These support members 32 have a lightening hole in the center portion and are permanently attached to the frame with screws, rivets, or the like. A pair of attaching channels 34 are jointed to the pan 30 providing the means to attach the support members 32 in a rotatable fashion with a pin, capscrew, rivet, or the like, as the fastening device through both legs of the channel and the companion supports 32. Attachment to the pan 30 may be by welding, brazing, riveting, etc. A pair of tandem wheels 36 with axles 37 are provided at the rear portion of the frame 20 and are on the same horizontal plane as the platform 28. The wheels 36 may include bearings, not shown, on the axles 37 to provide friction free rotation and are pivotally connected to the frame 20 with carriage members 39. The pivotal connection is made at the top end and is accomplished by the use of a capscrew, or rivet, rotatably affixed to the side of the longitudinal members 22. This arrangement permits the assembly to rotate, within limits, compensating for the irregular ground surface upon which the assembly may be placed, allowing both tandem wheels to be in contact with the ground at the same time. The wheels 36 may be of any suitable material, such as aluminum, steel, thermoplastic, including nylon, phenolic acrylic, polycarbonates, synthetic rubber compounds, wood, or the like, with the axles preferably metallic.

Figure 4:
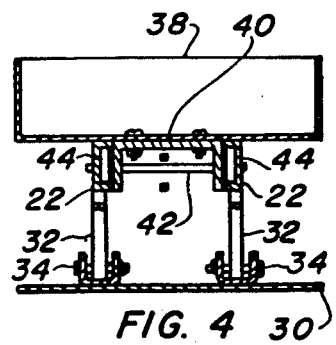
FIG. 4 is a cross-sectional view of the preferred embodiment taken along lines 4—4 of FIG. 2 looking forward.
Figure 5:
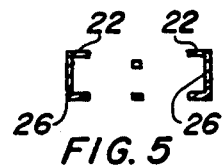
FIG. 5 is a cross-sectional view of the preferred embodiment taken along lines 5—5 of FIG. 2 illustrating the longitudinal member configuration.

A movable weight box 38 is slidably connected to the upper portion of the frame 20 with a channel shaped transport dolly 40, best depicted in FIGS. 4, 7 and 8. This dolly 40 has the web of the channel facing upward and is contiguous with the bottom of the box 38 and fastened with a plurality of threaded fasteners, or rivets, etc. A pair of dolly axles 42 penetrate both legs of the channel shaped dolly and a pair of dolly wheels 44 are affixed thereto. These wheels 44 enter into the recessed cavities 26 of the longitudinal members 22 allowing the weight box 38 to move freely fore and aft while still captivated within the cavity 26. The weight box 38 is rectangular in shape, or could be square with an open top, to allow dead weight to be easily added into the interior. Any dead weight may be utilized to fill the box, such as metallic objects, sand bags, etc., at the desired level corresponding to the pulling force required by the model vehicle.

A gear reduction system is employed to reduce the rotation of the wheels as the prime source of movement to slow the rotation allowing the apparatus to slowly shift the weight box from over the wheels 36 to over the center of the platform 28. This gear reduction is accomplished by the use of a pair of wheel driven sprockets 46, best illustrated in FIGS. 7 and 8, attached upon the wheel axles 37 with a wheel chain 48 connected between. These sprockets 46 are of the same size and transmit the same rotation as the axles 36 tieing them together for uniform torque when they are rotated. The chain 48 may be any type, however, roller bearing style is preferred.

An intermediate first sprocket 50 is also attached to the rear wheel axle, preferably the curb side. A transmission block 52 is rigidly joined to the underside of the frame 20 at the curb side longitudinal member 22. This block 52 contains a transmission block shaft 54 penetrating horizontally therethrough, and is fabricated of solid material, such as metal, plastic, wood, etc., and may have a bearing, if desired. On the inside end of the shaft 54 is a second intermediate sprocket 56 and on the outside end is a first drive shaft sprocket 58.

The sprockets may be the same size or different, as required by the desired speed ratio, however, the preferred embodiment utilizes a larger sprocket on the inside than the outside, reducing the circumference consequently the speed of the attaching drives.

An intermediate drive chain 60 engages the teeth of the first sprocket 50 and the second sprocket 56 rotatably lining the axle 37 and shaft 54 together. A drive shaft 62 penetrates the frame 20 at the rear of the apparatus and may be supported with bearings, such as ball type, sleeve, sintered bronze, nylon, teflon, or the like, or a simple oversize hole in the parent metal of the longitudinal member 22 itself. This shaft 62 extends beyond the frame 20 on the road side and supports a second drive shaft sprocket 64. These two sprockets 58 and 64 are connected by a drive chain 66, further reducing the speed ratio by using the smaller sprocket 58 on the bottom. In order to quickly interchange the speed ratio, the transmission block shaft 54 and drive shaft 62 have ends that extend to the road side with square shanks and quick disconnect pins allowing the sprockets 58 and 64 to be easily removed in pairs and replaced by another set having different diameters.

In order to change the movement from rotational to a linear drive, a final chain and set of sprockets are employed. A driven shaft 68 is positioned through the longitudinal members 22 at the front of the frame 20 with bearings of similar nature to those in the drive shaft 62. A driven sprocket 70 is secured approximately in the middle of the shaft 68 with a drive sprocket 72 similarly affixed on drive shaft 62 at the rear of the apparatus. A weight box chain 74 connects the two sprockets together and rotates nearly the full length of the device when motivated by the tandem wheels 36.

In order to functionally join the movable weight box 38 to the drive mechanism, a connecting pin 76, best depicted in FIGS. 7, 8, 11 and 12, is inserted into a guide block 78 attached to the front of the box 38 directly over the top of the chain 74. This block 78 is rectangular in shape and contains a bore for the pin 76 with a counterbored portion at the bottom. A collar 80 is fastened to the pin 76 at the bottom and a knob 82 at the top captivating the assembly within the block. The bottom end of the pin 76 is tapered and protrudes beyond the collar 80 allowing penetration of the chain 74 between the roller links. The pin 76 is stopped by the collar 80 resting on the top of the chain 74, as well as the knob 82 arresting the movement on the top of the guide block 78. When the pin 76 is manually lifted to disengage the chain 74 and reset the box 38 to the rear, the collar 80 enters the counterbored portion out of the way.

Figure 10:
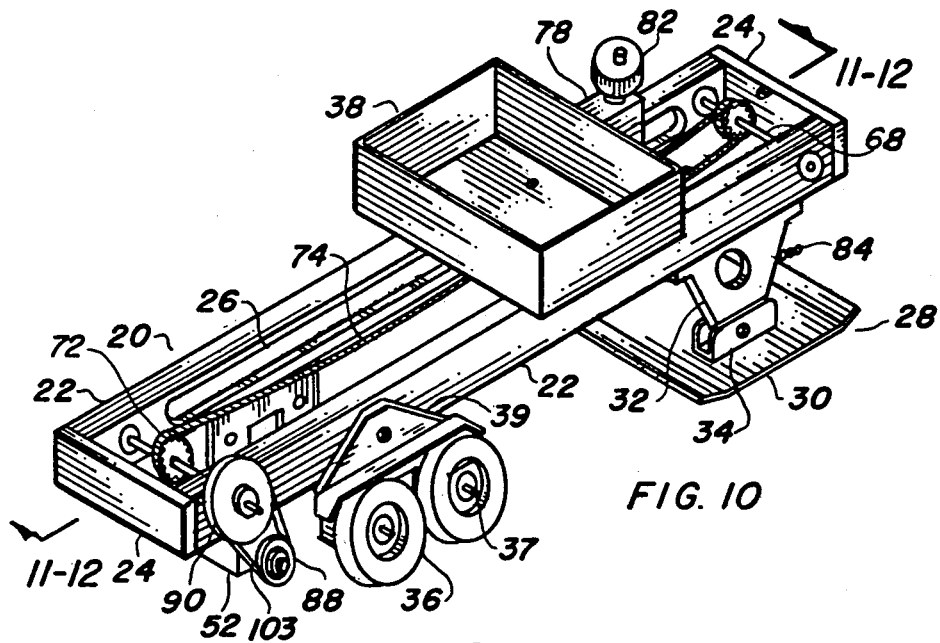
FIG. 10 is a partial isometric view of another embodiment having a belt driven gear reduction drive system and a smaller box and resistance platform.
Figure 11:
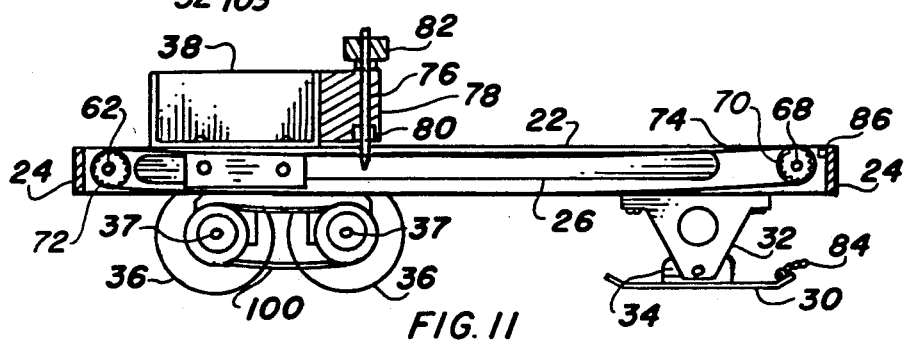
FIG. 11 is a cross-sectional view of the same embodiment as above taken along lines 11—11 of FIG. 10 with the weighted box in the starting position.
Figure 12:
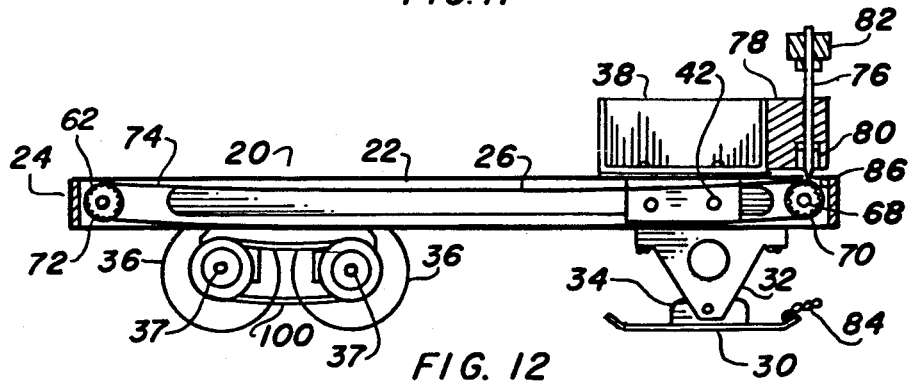
FIG. 12 is the same as above, except the weighted box has moved the entire length of the apparatus, such as in its disengaged condition.

In another embodiment, depicted in FIGS. 10, 11 and 12, the basic structure is the same, except the box 38 and pan 30 is smaller in size and the gear reduction drive utilizes belts and sheaves, instead of chains and sprockets. The only exception is the weight box chain 74, drive sprocket 72, and driven sprocket 70, which remain the same. A first drive shaft multi-grooved sheave 88 and second drive shaft multi-grooved sheave 90, shown in FIG. 10, also differ from their sprocket counterpart 58 and 64 by virtue of their plurality of grooves. The multi-grooved sheave arrangement allows the belt to be moved from one set of grooves to the other, changing the speed ratio without the necessity of removal and replacement. A three grooved stepped sheave is preferred, however, any number of grooves may be utilized as long as the relationship in diameter between the first and second sheave remain constant. The belts, 100, 102 and 103, shown in brackets on FIG. 9, with their chain counterpart 48, 60 and 66, may be of any configuration adaptable to the application, such as single or double vee, flat, cogged, however, round belts are preferred. It will be noted that in actual use the belt arrangement, while being more easily adapted to speed ratio change, is limited to weights in the box of 10 pounds (4.54) kilograms before excessive slippage is encountered.

It will be seen by the operation of the device that when a contest is to begin the invention is placed on a flat surface with a chain 84 attached to the model motorized vehicle and the appropriate amount of dead weight is placed in the weight box 38. The box positioned at the rear of the frame 20 by lifting the knob 82 and sliding the box 38 on its dolly wheels 44 rearward. The vehicle is started and begins moving forward pulling the device behind, relying upon the extended surface of the pan 30 as resistance to the energy dissipated by the vehicle with the total weight distributed upon this surface in a frictional manner. As the vehicle proceeds forward, the tandem wheels rotate along with the gear reduction train. The pin 76 is pierceably inserted into the weight box chain 74, therefore, the box 38 is moved forward linearly as the vehicle proceeds at a predetermined speed dependent upon the gear ratio of the sprockets selected. Increased frictional resistance of the apparatus is realized as the box 38 moves closer to the center of the sled pan 30 until full travel is completed providing the maximum resistance when it is completely over center. If the model vehicle is still in operation at that condition the pin 76 comes in contact with the driven sprocket 70 and is forced out of the penetrating position within the chain 74 riding over the top with the collar 80 resting on a pin stop 86 completely and automatically disengaging the box 38 from the drive system.

Reset of the apparatus is accomplished by lifting the knob 82 and sliding the box 38 rearward, as previously described. FIGS. 7 and 8 illustrate the movement of the box 38 on the frame 20. As the same cross section is taken, FIG. 7 depicts the box 38 reset at the beginning of the run at the extreme rearward position and FIG. 8 at the end of the run just as the pin 76 has touched the sprocket 70 and is forced upward, but has not as yet come to rest upon the stop 86.

FIG. 9 graphically depicts the sprocket and chain arrangement along with the appropriate shafts and axles. This pictorial display also includes the belt and sheave arrangement in the gear reduction drive system, except the multi-grooved sheaves 88 and 90 are not illustrated. For clarification, sheaves 88 and 90 are shown in FIG. 10 on sheet 3 of 3.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the claims.

I claim:

1. A model apparatus for indicating the relative pulling resistance applicable to dead weight and distance comprising:

(a) a generally rectangular frame including a pair of structural longitudinal frame members parallel to each other, said frame having a front portion and a rear portion, (b) platform resistance means attached to the underside of the front portion of said frame and providing a surface engageable with the ground against which relative pulling resistance may be measured, (c) a plurality of wheels mounted upon front and rear tandem wheel axles, said wheel axles being fastened to the underside of the rear portion of said frame, (d) gear reduction drive means connected to said wheel axles and drivingly connected to a rear drive shaft mounted upon said frame rear portion for transferring the rotation from said wheels to said rear drive shaft at a reduced speed, (e) a movable weight box slideably connected to the upper portion of said frame and movable in a linear direction contiguous thereto, said weight box being adapted to receive a dead weight mass therein, and (f) linear drive means mounted between said pair of longitudinal frame members and extending from the front to the rear portion thereof, said linear drive means being drivingly connected to said rear drive shaft and operable to position said movable weight box along the upper portion of said frame in response to rotating movement of said wheels, thereby causing said box to be moved from the rear portion to the front portion of said frame when said model apparatus is pulled by an external power source so as to transfer the weight of the weight box from over said wheels to over said platform resistance means, said gear reduction drive means comprising, first and second wheel sheaves drivingly interconnected by a round drive wheel belt, said first wheel sheave being drivingly attached to the front tandem wheel axle and the said second wheel sheave being drivingly attached to the rear tandem axle, first and second intermediate sheaves drivingly interconnected by an intermediate round drive belt, said first intermediate sheave being attached to said rear tandem axle and said second intermediate sheave being attached to a transmission shaft, and first and second multi-grooved sheaves drivingly interconnected by a transmission round drive belt, said first multi-grooved sheave being attached to said transmission shaft and said second multi-grooved sheave being attached to said rear drive shaft whereby the drive ratio between said wheels and said weight box may be varied by changing the position of said transmission drive belt on said multi-grooved sheaves.

2. The apparatus as recited in claim 1 wherein said platform resistance means further comprises a sled pan having a front and rear angular portion and a pair of side support members hingeably attached to said frame so as to allow the sled pan to pivot in relation to the frame to compensate for the ground surface upon which it is placed for operation thereof.

3. The apparatus as recited in claim 1 wherein said pair of tandem axles are connected through pivotal carriage members to said frame.

4. The apparatus as recited in claim 1 wherein said movable weight box further comprises an open topped rectangular five sided box affixed to a transport dolly having a plurality of dolly wheels rotatably positioned within said frame longitudinal members for linear movement of said weight box within the confines of said frame.

* * * * *